United States Patent
Hisaoka et al.

(10) Patent No.: US 10,967,275 B2
(45) Date of Patent: *Apr. 6, 2021

(54) PUZZLE BATTLE GAME

(71) Applicant: GREE, INC., Tokyo (JP)

(72) Inventors: Yusuke Hisaoka, Tokyo (JP); Akinori Adachi, Tokyo (JP); Megumi Ishikawa, Tokyo (JP)

(73) Assignee: GREE, INC., Tokyo (JP)

( * ) Notice: Subject to any disclaimer, the term of this patent is extended or adjusted under 35 U.S.C. 154(b) by 31 days.

This patent is subject to a terminal disclaimer.

(21) Appl. No.: 16/402,622

(22) Filed: May 3, 2019

(65) Prior Publication Data

US 2019/0299102 A1 Oct. 3, 2019

Related U.S. Application Data

(63) Continuation of application No. 14/621,487, filed on Feb. 13, 2015, now Pat. No. 10,328,348.

(30) Foreign Application Priority Data

Mar. 31, 2014 (JP) .................................. 2014-071374

(51) Int. Cl.
*A63F 13/20* (2014.01)
*A63F 13/77* (2014.01)
(Continued)

(52) U.S. Cl.
CPC .............. *A63F 13/77* (2014.09); *A63F 13/20* (2014.09); *A63F 13/2145* (2014.09); *A63F 13/537* (2014.09)

(58) Field of Classification Search
CPC ...... A63F 13/77; A63F 13/20; A63F 13/2145; A63F 13/537
See application file for complete search history.

(56) References Cited

U.S. PATENT DOCUMENTS 6,093,104 A 7/2000 Kasahara et al.
6,354,939 B1 3/2002 Morita et al.
(Continued)

FOREIGN PATENT DOCUMENTS

JP 10-66784 A 3/1998
JP 2005-296530 A 10/2005
(Continued)

OTHER PUBLICATIONS

Feb. 12, 2020 Office Action issued in Japanese Patent Application No. 2019-020199.
(Continued)

*Primary Examiner* — Corbett B Coburn
(74) *Attorney, Agent, or Firm* — Oliff PLC (57) ABSTRACT

A recording medium that stores a game program processing the progress of a puzzle game and a battle game is provided. When executed on a computer including an input surface capable of detecting a touch operation of a user, the game program executes instructions. The instructions include determining whether or not a puzzle selected by the touch operation satisfies predetermined conditions, determining whether or not puzzles selected by the touch operation by drawing a locus on the input surface have the same attribute as one of the predetermined conditions, and displaying a game content for use in the battle game on a screen of the puzzle game when it is determined that the predetermined conditions are satisfied.

18 Claims, 7 Drawing Sheets

(51) Int. Cl.
*A63F 13/2145* (2014.01)
*A63F 13/537* (2014.01)

(56) References Cited

U.S. PATENT DOCUMENTS

| | | | |
|---|---|---|---|
| 10,328,348 B2* | 6/2019 | Hisaoka | A63F 13/31 |
| 2008/0254849 A1 | 10/2008 | Nomura et al. | |
| 2014/0080560 A1 | 3/2014 | Knutsson | |
| 2014/0302935 A1 | 10/2014 | Royce | |
| 2015/0297988 A1 | 10/2015 | Fujita | |
| 2016/0214014 A1 | 7/2016 | Shiota et al. | |

FOREIGN PATENT DOCUMENTS

| | | |
|---|---|---|
| JP | 2006-334289 A | 12/2006 |
| JP | 2007-244663 A | 9/2007 |
| JP | 2008-073254 A | 4/2008 |
| JP | 2011-62262 A | 3/2011 |
| JP | 2011-206444 | 10/2011 |

OTHER PUBLICATIONS

Sep. 11, 2018 Office Action issued in Japanese Patent Application No. 2016-159736.
Notification of Reasons for Refusal dated Feb. 27, 2018, from corresponding Japanese Patent Application No. 2016-159736 along with an English translation.
Puzzles & Dragons (Registered Trademark), Internet (URL: http://www.gungho.jp/pad/), Jun. 30, 2014, with English translation.
Notice of Reasons for Rejection of corresponding Japanese Application No. 2014-215477 dated Jan. 13, 2015 with English translation.
Decision of Rejection of corresponding Japanese Application No. 2014-071374 dated Jul. 29, 2014 with English translation.
Notice of Reasons for Rejection of corresponding Japanese Application No. 2014-071374 dated May 27, 2014 with English translation.
Yoshimasa, PuzzleDefense by Flashgame Today, [Online], Mar. 30, 2009, URL, http://flashgametoday.ip/2009/03/30050000.php (5 pages) with English summary.
Maaai0813, Line Pokopan:Snapping exhilarating puzzle game, Let's trace the blocks in such a way as to trace the lines! Free.—Fun iPhone! AppBank, [Online], AppBank Co., Ltd., Dec. 18, 2013, URL, http://www.appbank.net/2013/12/18/iphone-application/720678.php (10 pages).
Johnson, N., "Puzzle Defense: Dragons Review—Gamezebo," [Online], Gamezebo, Inc., Feb. 14, 2014, URL, http://www.gamezebo.com/games/puzzle-defense-dragons/review (8 pages).
Notice of Reasons for Rejection dated Sep. 8, 2015 of corresponding Japanese Patent Application No. 2015-130426 along with an English translation.
"Tetris Monsters", "Monthly Appli STYLE November issue", East Press Business, Aug. 28, 2013, vol. 1, No. 10, pp. 008-009.
Japanese Decision of Rejection dated Apr. 7, 2015 of corresponding Japanese Application No. 2014-215477 along with its English translation.
Maaai0813, "Line Pokopang: Addictive Exploding Puzzle Game. Draw lines to join blocks! FREE", (online), Dec. 18, 2013, AppBanks Games Inc., http://www.appbank.net/2013/12/18/iphone-application/720678.php along with English translation.

* cited by examiner

PUZZLE BATTLE GAME

CROSS-REFERENCE TO RELATED APPLICATION(S)

This application is a continuation of U.S. application Ser. No. 14/621,487 filed Feb. 13, 2015, which is based on and claims priority under 35 U.S.C. 119 from Japanese Patent Application No. 2014-071374 filed on Mar. 31, 2014. The contents of the above applications are incorporated herein by reference in their entireties.

TECHNICAL FIELD

This disclosure relates to a recording medium storing a game program, which processes the progress of a puzzle game and a battle game, and the like.

BACKGROUND

With the spread of electronic devices such as smartphones and tablet terminals, in addition to games for home video game machines, games for electronic devices are being actively developed. For example, as disclosed in PUZZLE & DRAGONS (Registered Trademark), Internet (www.gung-ho.jp/pad/), games in which characters compete with one another are being developed.

Figure 5:
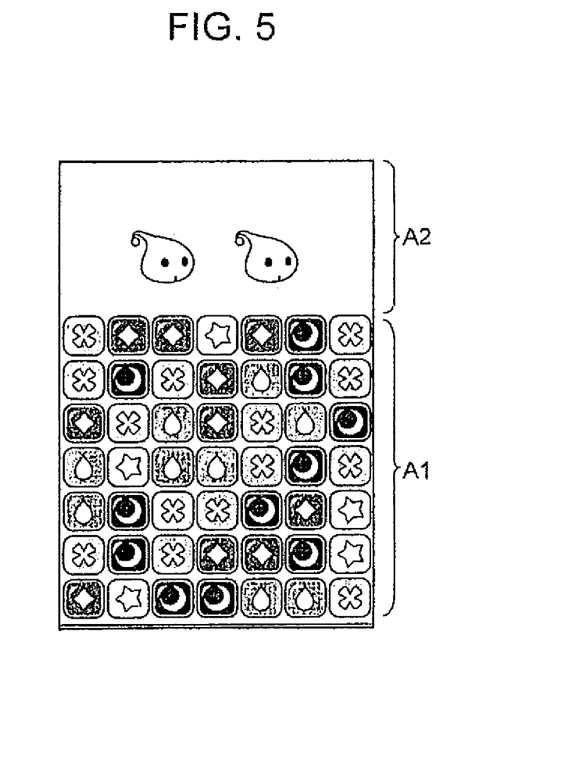
FIG. 5 is a schematic view illustrating a game screen of a prior art game.

FIG. 5 is a schematic view illustrating a game screen of a game of the related art represented by a game disclosed in PUZZLE & DRAGONS. As illustrated in FIG. 5, a region A1 where a puzzle is displayed and a region A2 where the process of a battle between characters is displayed are separated on the game screen. For this reason, a battle with characters is only based on a secondary result of solving a puzzle, and a strategic characteristic and a sense of immersion when solving a puzzle are degraded.

It could therefore be helpful to provide a recording medium storing a game program capable of realizing a highly interesting strategic game with puzzles linked with battles between characters.

SUMMARY

I provide a recording medium for storing a game program which processes the progress of a puzzle game and a battle game, the game program when executed on a computer including an input surface capable of detecting a touch operation of a user to execute instructions to determine whether or not a puzzle selected by a touch operation satisfies predetermined conditions, to determine whether or not puzzles selected by the touch operation by drawing a locus on the input surface have the same attribute as one of the predetermined conditions, and displaying a game content for use in the battle game on a screen of the puzzle game when it is determined that the predetermined conditions are satisfied.

The touch operation of the user refers to an operation of the user to bring a finger or an indicator (for example, a stylus or the like) into contact with or close to the input surface to provide an input to the computer.

I also provide a recording medium, which further executes: erasing the puzzle and changing the arrangement of other puzzles different from the puzzle when it is determined that the predetermined conditions are satisfied, and displaying further other puzzles changed in arrangement.

I also provide a recording medium, which further executes: displaying the game content on the puzzle in a superimposed manner near a position corresponding to the end of the locus.

I also provide a recording medium, which further executes: displaying the game content near a gauge indicating the cumulative points of the game content.

I also provide a recording medium, which further executes: determining whether or not a predetermined number or more of puzzles are arranged to form a rectangle as one of the predetermined conditions.

I also provide a recording medium, which further executes: awarding points according to awarding conditions including a number of puzzles satisfying the predetermined conditions as one of the conditions, determining whether or not a cumulative value of respective points of the game content awarded exceeds a predetermined threshold value, and displaying the game content on the puzzle when it is determined that the cumulative value of the points exceeds the predetermined threshold value.

I also provide a recording medium, which further executes: awarding points according to the awarding conditions further including at least one of the number of game contents displayed on the puzzles and a level of the user as one of the conditions.

I also provide a recording medium, which further executes: generating a benefit having a predetermined effect in the game according to the touch operation by drawing a locus on the input surface.

I also provide a recording medium, which further executes: processing the progress of a game in which a first game content, which is selectively provided to the user, is displayed on the screen of the puzzle game according to progress of the puzzle game, and is used in the battle game, competes with a second game content which moves in a predetermined direction on the screen of the puzzle game.

I also provide a recording medium, wherein the game content has different parameters set in advance.

I also provide a recording medium, which further executes: activating a predetermined effect in the game when it is determined that the total cumulative value of points awarded exceeds a predetermined threshold value.

I also provide a recording medium, wherein the predetermined effect is that the puzzles are successively erased.

I further provide a method of controlling an information processing apparatus which includes an input surface adapted to detect a touch operation of a user and processes progress of a puzzle game and a battle game, the method including a determination step in which a determination device of the information processing apparatus determines whether or not a puzzle selected by a touch operation on the input surface satisfies predetermined conditions, determining whether or not puzzles selected by the touch operation by drawing on a locus on the input surface have the same attribute as one of the predetermined conditions, and a display step in which a display device of the information processing apparatus displays a game content for use in the battle game on a screen of the puzzle game when it is determined in the determination step that the predetermined conditions are satisfied.

I also provide a method, further including: a changing step in which a changing device of the information processing apparatus erasing the puzzle and changing the arrangement of other puzzles different from the puzzle when it is determined in the determination step that the predetermined conditions are satisfied, wherein, in the display step, other puzzles changed in arrangement are further displayed.

I also provide a method wherein, in the display step, the game content is displayed on the puzzle in a superimposed manner near a position corresponding to the end of the locus.

I further provide an information processing apparatus which includes an input surface adapted to detect a touch operation of a user and processes progress of a puzzle game and a battle game comprising a determination device which determines whether or not a puzzle selected by a touch operation on the input surface satisfies predetermined conditions and whether or not puzzles selected by the touch operation by drawing a locus on the input surface have the same attribute as one of the predetermined conditions, and a display device which displays a game content for use in the battle game on a screen of the puzzle game when the determination device determines that the predetermined conditions are satisfied.

I also provide an information processing apparatus, further including: a changing device which erases the puzzle and changes the arrangement of other puzzles different from the puzzle when the determination device determines that the predetermined conditions are satisfied, wherein the display device further displays other puzzles changed in the arrangement.

According to the recording medium storing a game program, the method of controlling an information processing apparatus, and the information processing apparatus, when a puzzle satisfies predetermined conditions, a game content for use in a battle game is displayed on a screen of a puzzle game. Therefore, according to the recording medium storing a game program and the like, it is possible to provide a highly interesting strategic game with puzzles linked with battle between game contents.

BRIEF DESCRIPTION OF THE DRAWINGS

FIGS. 2A and 2B are schematic views illustrating an example of a game screen displayed on a display unit in the mobile terminal and, specifically.

DESCRIPTION OF REFERENCE SIGNS

1: locus
2: rectangle
6: puzzle
7a: character (game content)
7b: enemy character (game content)
8b: ending point (position corresponding to end of locus)
11: puzzle determination unit (determination function)
12: rectangle determination unit (determination function)
13: benefit generation unit (generation function)
14: point awarding unit (awarding function)
15: puzzle change unit (change function)
16: point determination unit (point determination function)
17: display output unit (display function, display unit)
18: determination unit (determination function)
41: input surface
100: mobile terminal (computer, information processing apparatus)

DETAILED DESCRIPTION

An example will be described referring to FIGS. 1 to 4.
Outline of Mobile Terminal 100

Figure 2A:
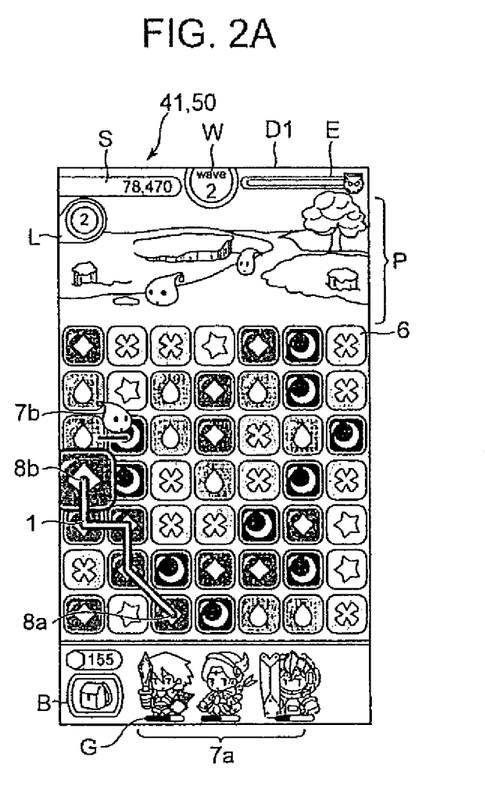
FIG. 2A illustrates an example of a game screen on which a locus is displayed on puzzles.
Figure 2B:
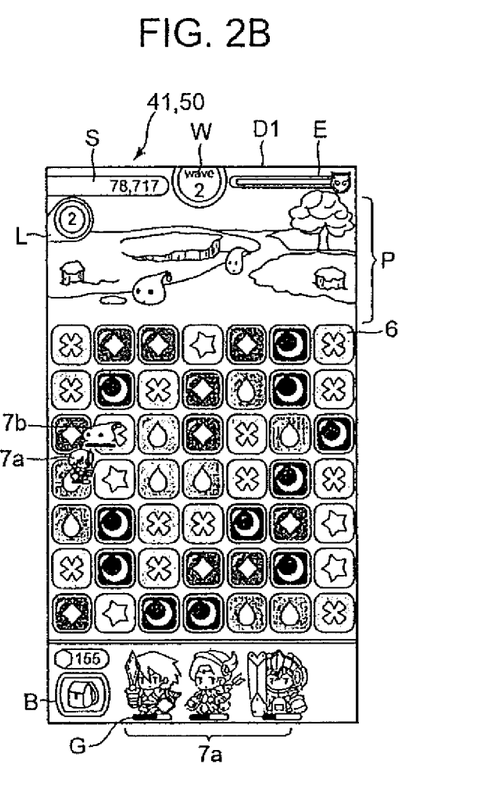
FIG. 2B illustrates an example of a game screen on which a character is displayed at an ending point of the locus.

FIGS. 2A and 2B are schematic views illustrating an example of a game screen displayed on a display unit 50 in a mobile terminal 100 and, specifically, FIG. 2A illustrates a game screen D1 on which a locus 1 is displayed on puzzles 6, and FIG. 2B illustrates a game screen D2 on which a character 7a is displayed at an ending point 8b of the locus 1.

The mobile terminal 100 is an information processing apparatus (computer) including an input surface 41 adapted to detect a touch operation of a user and processes the progress of a puzzle game and a battle game using a character (game content).

As illustrated in FIG. 2A, if the user follows the input surface 41 (performs a single-stroke touch operation on the input surface 41) using a finger (or an indicator such as a stylus), the locus 1 connecting a touch-down position on the input surface 41 (a position where touch to the input surface 41 starts; hereinafter, referred to as "starting point 8a") to a touch-up position (a position where touch to the input surface 41 ends; hereinafter, referred to as "ending point 8b") is drawn on a plurality of puzzles 6, and the plurality of puzzles 6 is selected.

When a plurality of puzzles 6 selected by a touch operation to draw the locus 1 has the same color or pattern (attribute), the mobile terminal 100 erases (deletes) a plurality of puzzles 6 and changes the arrangement of other puzzles 6 different from a plurality of puzzles.

Next, the mobile terminal 100 adds predetermined points according to the number of puzzles 6 included in the locus 1 or the like. When a cumulative value of the points exceeds a predetermined threshold value, the mobile terminal 100 displays the character 7a (a game content or a first game content) for use in a battle game on the puzzle 6 in a superimposed manner (that is, on the screen of the puzzle game) near the ending point 8b (in a predetermined region including the ending point 8b) as shown in FIG. 2B.

The character 7a competes (performs a battle with) an enemy character 7b (second game content) which moves in a predetermined direction on the puzzles 6 (on the screen of the puzzle game). The character 7a defeats an enemy character 7b, whereby it is possible to prevent a game ending condition (for example, the enemy character 7b reaches the lowest portion of the game screen D1) from being satisfied and to allow the user to continue the game.

That is, the mobile terminal 100 displays the game screen D1 on which a region where puzzles are displayed and a region where the process of battle between characters is displayed are integrated (as the game screen of the game of the related art illustrated in FIG. 5, the two regions are not separated). With this, the mobile terminal 100 can provide a highly interesting strategic game with puzzles linked with battle between characters.

The mobile terminal 100 does not force the user to move a focus between the two regions. With this, the mobile terminal 100 can provide a sense of immersion in the game to the user.

As described above, the game is a game in which the character 7a (the character 7a for use in the battle game) which is displayed on the screen of the puzzle game according to the progress of the puzzle game competes with the enemy character 7b which moves (moves in a predetermined direction) on the screen of the puzzle game. However, the configuration of the game and the game screen D1 illustrated in the drawing are merely examples for descriptive purposes, and this disclosure is not limited thereto.

Similarly, the character 7a and the enemy character 7b may be predetermined game contents (arbitrary electronic data used by the user in the game) for use in the progress of the puzzle game, and the shape, pattern, color, and the like are not limited to the shape and the like described in the above description and the drawings.

Configuration of Mobile Terminal 100

Figure 1:
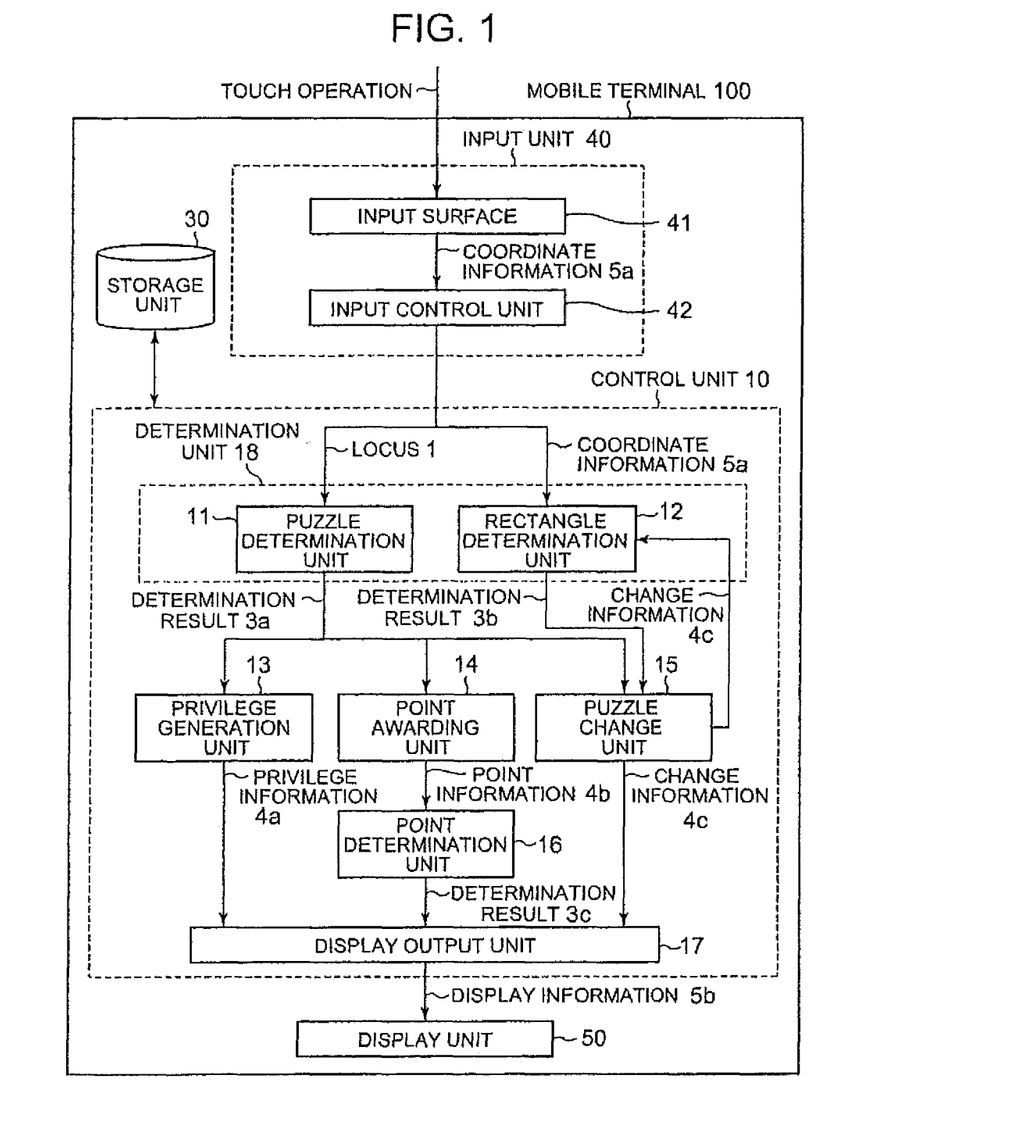
FIG. 1 is a block diagram illustrating a configuration of a main part of a mobile terminal according to an example.

FIG. 1 is a block diagram illustrating configuration of a main part of the mobile terminal 100. As illustrated in FIG. 1, the mobile terminal 100 includes an input unit 40 (input surface 41 and input control unit 42), a control unit 10 (puzzle determination unit 11, rectangle determination unit 12, benefit generation unit 13, point awarding unit 14, puzzle change unit 15, point determination unit 16, display output unit 17, and determination unit 18), a display unit 50, and a storage unit 30.

The input unit 40 receives a touch operation of the user. In this example, the input unit 40 may be a touch panel adapted to detect multi-touches. The input unit 40 includes an input surface 41 and an input control unit 42.

The input surface 41 is a device (for example, a touch surface included in the touch panel) adapted to detect a position designated by the touch operation of the user. The input surface 41 outputs coordinate information 5a corresponding to the designated position to the input control unit 42.

The input control unit 42 retrieves coordinate information 5a from the input surface 41 at a predetermined time interval and outputs a series of coordinate information 5a to the puzzle determination unit 11 as the locus 1. When the coordinate information 5a is retrieved from the input surface 41, the input control unit 42 outputs the coordinate information 5a to the rectangle determination unit 12.

The control unit 10 comprehensively controls the functions of the mobile terminal 100. The control unit 10 includes a determination unit 18 (puzzle determination unit 11 and rectangle determination unit 12), a benefit generation unit 13, a point awarding unit 14, a puzzle change unit 15, a point determination unit 16, and a display output unit 17.

The determination unit (determination function) 18 determines whether or not a plurality of puzzles 6 selected by the touch operation satisfies predetermined conditions. The determination unit 18 includes a puzzle determination unit 11 and a rectangle determination unit 12.

The puzzle determination unit (determination function) 11 determines whether or not a plurality of puzzles 6 selected by the touch operation to draw the locus 1 on the input surface 41 has the same color or pattern (attribute) as one of the predetermined conditions and outputs the determined result (determination result 3a) to the benefit generation unit 13, the point awarding unit 14, and the puzzle change unit 15.

The rectangle determination unit (determination function) 12 determines whether or not a predetermined number or more of puzzles 6 are arranged to form a rectangle as one of the predetermined conditions and outputs the determined result (determination result 3b) to the puzzle change unit 15. The rectangle determination unit 12 determines whether or not the arrangement (information regarding the arrangement is included in change information 4c) of the puzzles 6 after the change has been made to form a predetermined rectangle.

The benefit generation unit (generation function) 13 generates a benefit having a predetermined effect in the game according to the locus 1 drawn on the input surface 41 and outputs information (benefit information 4a) regarding the generated benefit to the display output unit 17.

The point awarding unit (awarding function) 14 awards points according to awarding conditions including the number of puzzles 6 satisfying the predetermined conditions as one of the conditions. The point awarding unit 14 awards points according to the awarding conditions including at least one of the number of characters 7a displayed on the puzzles 6 by the display output unit 17 and the level of the user as one of the conditions. The point awarding unit 14 outputs information (point information 4b) regarding the awarded points to the point determination unit 16.

When the puzzle determination unit 11 determines that the predetermined conditions are satisfied, the puzzle change unit (change function) 15 erases the selected puzzles 6 and changes the arrangement of other puzzles 6 different from the puzzles 6. For example, the puzzle change unit 15 sequentially moves down and arranges other puzzles 6 displayed in the upper portion of the screen from the puzzles 6 such that the positions at which the puzzles 6 are displayed are filled with other puzzles 6. The puzzle change unit 15 outputs information (change information 4c) regarding the arrangement of puzzles after change to the display output unit 17.

When the rectangle determination unit 12 determines that the puzzles 6 are arranged to form a rectangle, the puzzle change unit 15 erases the puzzles 6 and changes the arrangement of other puzzles 6 different from the puzzles 6 arranged to form a rectangle. In this case, the puzzle change unit 15 outputs the change information 4c to the display output unit 17 and the rectangle determination unit 12.

The point determination unit (point determination function) 16 determines whether or not a cumulative value of the points awarded by the point awarding unit 14 exceeds a predetermined threshold value and outputs the determined result (determination result 3c) to the display output unit 17.

When the determination unit 18 (puzzle determination unit 11 or rectangle determination unit 12) determines that the predetermined conditions are satisfied, the display output unit (display function or display unit) 17 displays the character 7a for use in the battle game on the screen of the puzzle game. For example, the display output unit 17 displays the character 7a on the puzzle 6 in a superimposed manner near a position corresponding to the end of the locus 1 (that is, on the screen of the puzzle game). The "position corresponding to the end" is an example, and the display output unit 17 can display the character 7a on the puzzle 6 in a superimposed manner near an arbitrary position (for example, a starting point, an intermediate point or the like) of the locus 1. When the point determination unit 16 determines that the cumulative value of the points exceeds the predetermined threshold value, the display output unit 17 displays the character 7a on the puzzle 6.

The display output unit 17 further displays other puzzles 6 changed in arrangement by the puzzle change unit 15. The display output unit 17 generates information (display information 5b) regarding a game screen (see FIGS. 2A, 2B, and 3) on which the puzzles 6 are arranged and outputs the generated information to the display unit 50.

The storage unit 30 is, for example, a storage device which is constituted by an arbitrary recording medium such as a hard disk, a solid state drive (SSD), a semiconductor memory, or a DVD, and stores a game program capable of controlling the mobile terminal 100 and data.

The display unit 50 is a device that displays a game screen. In this example, the display unit 50 may be a liquid crystal display. In FIG. 1, to clearly indicate the functions of the input unit 40 and the display unit 50, both are shown separately. However, for example, when the input unit 40 is a touch panel and the display unit 50 is a liquid crystal display, both are constituted as a single body.

Details of Game Screen

As described above referring to FIG. 2A, when the user follows the input surface 41 with a finger to draw the locus 1 connecting a plurality of puzzles 6 having the same color or pattern vertically, horizontally, or obliquely, the mobile terminal 100 erases (deletes) a plurality of puzzles 6 and changes the arrangement of other puzzles 6.

The mobile terminal 100 adds points for each character 7a according to (1) the number of puzzles 6, (2) the number of characters 7a of the same kind already displayed on the puzzles 6, and/or (3) the level of the user, and the like. That is, as displayed in the lower portion of the game screen D1 illustrated in FIG. 2A, the user can select a plurality of characters 7a. The mobile terminal 100 adds the points to the cumulative points of the character 7a currently selected. In FIG. 2A, the cumulative points of the character 7a are indicated by a gauge G. The number of appearing characters 7a may be indicated near the gauge G.

If the gauge G is full (the cumulative points exceed a predetermined threshold value), the mobile terminal 100 displays the character 7a currently selected at a place (near the ending point 8b) finally followed by the user (see FIG. 2B). If the enemy character 7b enters the range set for each character 7a, the character 7a takes a predetermined action to the enemy character 7b (for example, approaches the enemy character 7b and slashes the enemy character 7b with a sword, shoots an arrow toward the enemy character 7b from a distance, stops the progress of the enemy character 7b with a shield, tumbles with the enemy character 7b, or the like). With this, for example, it is possible to stop the progress of the enemy character 7b or to force the enemy character 7b to retreat.

That is, the user needs to determine a method of drawing the locus 1 including a plurality of puzzles 6 to be erased after selecting the optimum character 7a according to the position of the enemy character 7b on the puzzles 6 and the characteristic of the character 7a and considering a position at which the character 7a should be displayed. Therefore, the mobile terminal 100 can provide a highly interesting strategic game with puzzles linked with battle between characters.

The mobile terminal 100 can provide an enemy character notification region P on the game screen D1 and can notify the user of the number or type of enemy characters 7b coming into the puzzles 6 in the enemy character notification region P. With this, since the mobile terminal 100 can request the user to cope with a coming enemy character 7b, it is possible to give the user a sense of tension in the game.

In the above description, although a configuration in which the enemy characters 7b sequentially appears downwardly from above of the game screen D1 has been described, all of the enemy characters 7b may appear simultaneously at the start of the game, or the enemy characters 7b may appear in a formation. The mobile terminal 100 may notify the user of the position where the enemy character 7b appears. For example, one point on the puzzles 6 of the game screen D1 blinks, whereby the user can know the position where the enemy character 7b appears.

The user taps an item button B, thereby selecting or using a predetermined item. The item includes an item having an effect of (1) stopping the motion of the enemy character 7b, (2) changing the arrangement to easily erase the puzzles 6, (3) causing damage to an enemy, (4) increasing the number of selectable characters 7a, (5) doubling points obtained by erasing the puzzles 6, (6) lowering the predetermined threshold value to display the character 7a, (7) providing an experience value to the character 7a or the like. That is, the mobile terminal 100 provides the user with an item to make the game advantageous, whereby it is possible to render the game more accessible and expand the base of users.

The current level of the user is indicated by a level display L. The level increases according to a score (indicated by a score display S) acquired when the user plays and progresses in the game. The mobile terminal 100 can provide a previous score or a score acquired by another user to be readable by the user. With this, the mobile terminal 100 can stimulate a user's aspiration over the game.

A current stage is indicated by a stage display W. The user plays and progresses in the game, whereby the number of stages increases and the difficulty of the game increases. The remaining number of enemy characters 7b in the current stage is indicated by a remaining enemy number display E. The mobile terminal 100 can set the elapsed time after a game play starts, the number of erased puzzles 6, the number of acquired benefits, the number of defeated enemy characters 7b, the defeat of a predetermined enemy character 7b or the like as one condition to end a stage.

The higher the level, the more the mobile terminal 100 may increase points obtained when the puzzles 6 are erased. Similarly, the greater the number of erased puzzles 6, the more the mobile terminal 100 may increase the points, or the greater the number of characters 7a displayed on the puzzles 6, the more the mobile terminal 100 may decrease the points. With this, the mobile terminal 100 can further increase the interest and strategic characteristic of the game.

A display aspect of each character 7a may be controlled according to a method of erasing the puzzles 6. For example, the mobile terminal 100 can determine and control at least one of the type of the characters 7a and the number of characters 7a according to the puzzles 6 selected by the touch operation of the user and determined that the predetermined conditions are satisfied (according to the method of erasing the puzzles 6).

The mobile terminal 100 can limit the total number of characters 7a on the predetermined conditions. For example, the mobile terminal 100 may provide an upper limit of the total number of characters 7a displayable for a predetermined time (for example, within five minutes) or may provide an upper limit of the total number of characters 7a displayable through one stage.

The mobile terminal 100 can limit the number of types of characters 7a selectable on the predetermined conditions.

For example, the mobile terminal 100 can limit the number of types of characters 7a selectable in a certain stage to five. In this case, the user can designate the character 7a to be selectable during the play of the stage among usable characters 7a before the play of the stage starts.

The user can provide a predetermined effect directly to the enemy character 7b by erasing the puzzles 6. For example, when the user erases the puzzles 6 by a predetermined combination, it is possible to provide an effect of suppressing the movement of the enemy character 7b, erasing the enemy character 7b on the puzzle 6 along with the puzzle 6 or the like to the enemy character 7b.

Erasure of Rectangle of Puzzles

Figure 3:
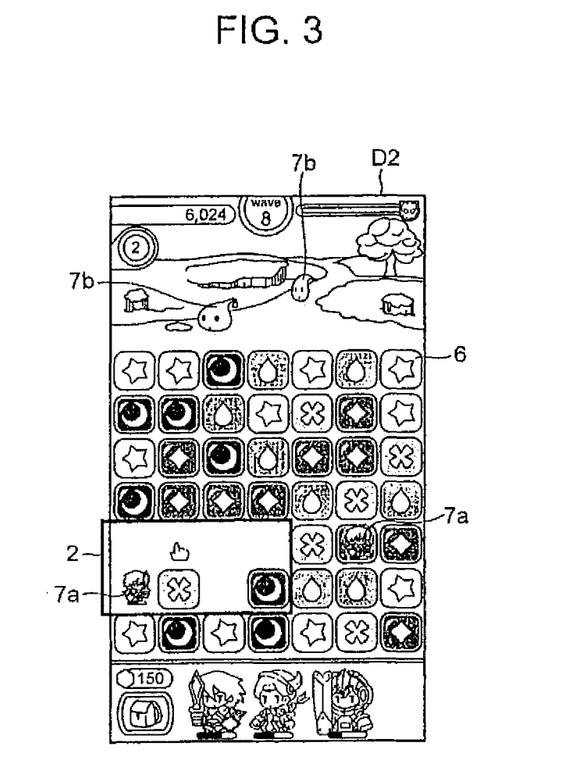
FIG. 3 is a schematic view illustrating an example of a game screen displayed when a predetermined number or more of puzzles having the same color or pattern are arranged adjacent to one another vertically and horizontally.

FIG. 3 is a schematic view illustrating a game screen D2 displayed when a predetermined number or more of puzzles 6 having the same color or pattern are arranged adjacent to one another vertically and horizontally. As illustrated in FIG. 3, when a predetermined number (for example, six) or more of puzzles 6 are arranged adjacent to one another vertically and horizontally, and the puzzles 6 form a rectangle 2, the mobile terminal 100 applies a predetermined effect (for example, blinking or the like) to display the puzzles 6. In this case, the user can erase the puzzles 6 only by tapping the puzzles 6 (providing the ending point 8b on the input surface 41) without following the input surface 41.

When the cumulative points of the character 7a currently selected exceed a predetermined threshold value by the erasure, and the mobile terminal 100 displays the character 7a on the puzzle 6, the mobile terminal 100 can make the character 7a appear from a place (for example, the center of the rectangle 2) where the puzzles 6 are erased.

When the rectangle determination unit 12 determines that the puzzles changed in arrangement are further arranged to form the rectangle 2, the puzzle change unit 15 further changes the arrangement of the puzzles 6. That is, the puzzles satisfying the conditions are erased one after another to link with the initial erasure. With this, the mobile terminal 100 can give the user a sense of exhilaration such that the puzzles are erased at a time from the game screen.

The rectangle 2 illustrated in FIG. 3 is merely for convenience of description. That is, the mobile terminal 100 may or not display the rectangle 2 on an actual game screen.

Individuality of Character

The characters 7a selectable by the user may have different parameters (hit point, attack power, defense power, attack range, movement speed, movement range and the like). As described above, the actions of the characters 7a to the enemy character 7b may be different. With this, the mobile terminal 100 can further increase the strategic characteristic of the game.

For example, the user selects a character 7a which shoots an arrow toward an enemy character 7b who is dangerous when approached and displays the character 7a at a position away from the enemy character 7b, whereby a strategy to attack from a distance is required. Alternatively, for an enemy character 7b which has a high hit point and requires a long time in tumbling, a strategy to make a character 7a having high attack power attack while using a character 7a, which stops the progress of the enemy character 7b with a shield, is required.

In this way, since the mobile terminal 100 displays the character 7a and the enemy character 7b on the puzzles 6 in a superimposed manner such that a region where puzzles are displayed and a region where the process of battle between characters is provided are integrated, it is possible to provide a highly interesting strategic game with puzzles linked with the battle between characters.

The cumulative value of the points necessary to make the character 7a appear may be different for each character 7a. For example, the stronger the character 7a, the greater the cumulative points may be required. With this, the mobile terminal 100 can appropriately maintain game balance.

Similarly, the enemy characters 7b may have different parameters. The type of movable puzzles 6 may be different for each enemy character 7b. For example, an enemy character 7b drawn in blue is movable only on the puzzles 6 drawn in blue. With this, since the mobile terminal 100 can make enemy character 7b rich in variation appear, it is possible to provide a more highly interesting strategic game.

The character 7a and the enemy character 7b may have attributes or corresponding items set as different parameters. For example, when the attribute of the character 7a is "fire," the user can attack when the enemy character 7b is "wood" (or a hit point becomes higher), and cannot attack when the enemy character 7b is "water" (or the hit point becomes lower). For example, when the character 7a attacks the enemy character 7b, the weak item of the enemy character 7b may be set such that the hit point of a "sword" becomes higher compared to when the corresponding item of the character 7a is an "arrow." The user can confirm the weak item of the enemy character 7b, for example, by referring to detailed information of the enemy character 7b. The detailed information of the enemy character 7b may be displayed on the game screen before a battle, or the detailed information of each character during a battle may be displayed (may be displayed in the enemy character notification region P, may be displayed if the enemy character 7b appeared on the puzzles 6 is tapped or the like).

Other Examples

Figure 6:
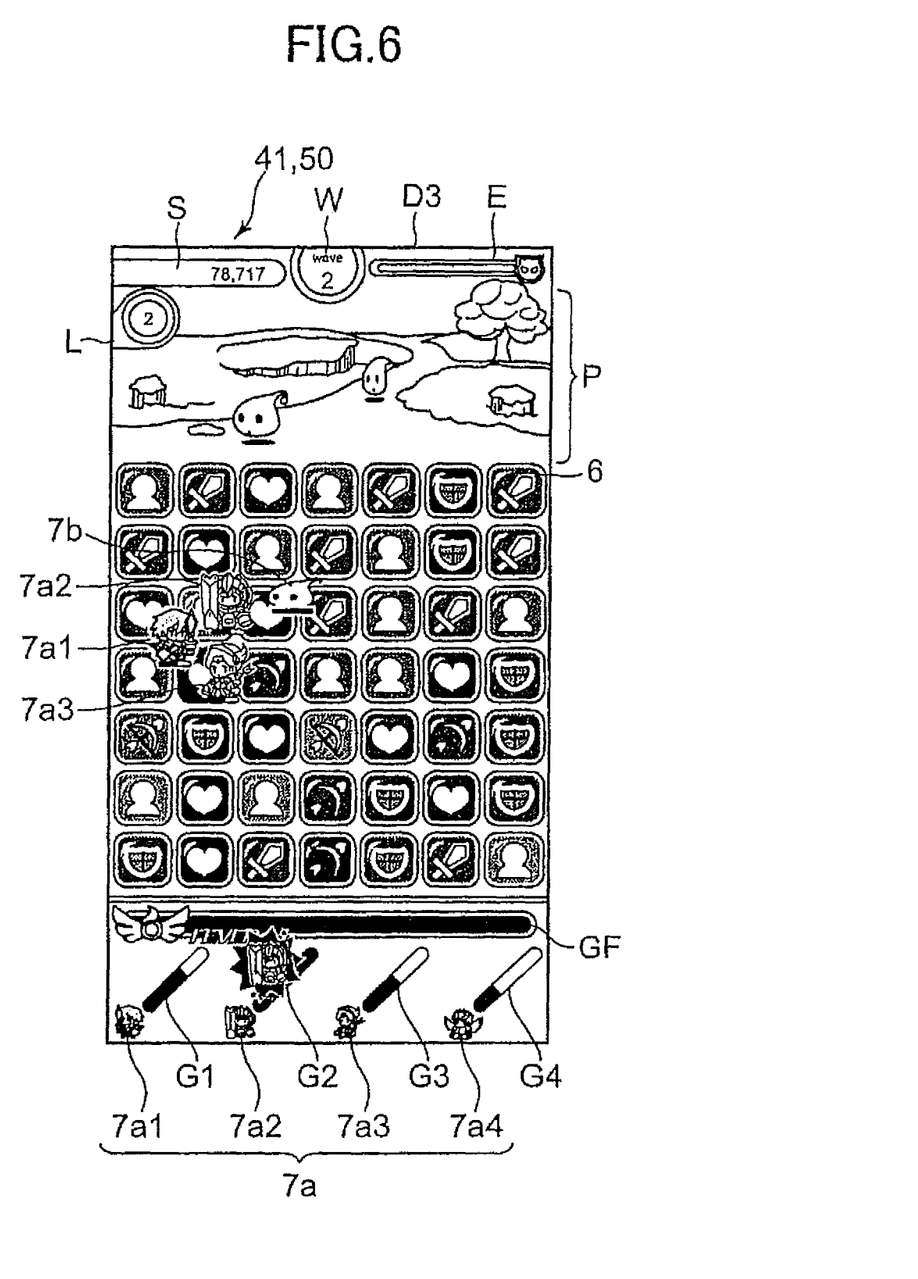
FIG. 6 is a schematic view illustrating an example of a game screen displayed on a display unit in the mobile terminal.

In the foregoing example, although a configuration in which the user arbitrarily selects a character among a plurality of characters 7a displayed in the lower portion of the game screen and points are added according to the number of erased puzzles 6 (regardless of the type of the puzzles 6) for the selected character 7a has been described, the example is not limited thereto. FIG. 6 is a schematic view illustrating an example of a game screen displayed on the display unit in the mobile terminal, and illustrates an example of a game screen on which each character is displayed on the gauge of the character.

For example, points may be added to the gauge G of each character 7a according to an icon (item) shown in the puzzles 6 erased by the user. Specifically, as illustrated in FIG. 6, when the user erases the puzzles 6 of an icon of a sword, points are added for a character 7a1 of a sword (which slashes at the enemy character 7b with the sword), and a gauge G1 of the character 7a1 of the sword increases. When the user erases puzzles 6 of an icon of a shield, points may be added for a character 7a2 of a shield (which stops the progress of the enemy character 7b), and a gauge G2 of the character 7a2 of the shield may increase. Although an example where points are added for the character 7a according to an icon shown in the puzzles 6 and the corresponding gauge G increases has been described, for example, the gauge G of the character 7a corresponding to the color of the puzzles may increase according to the color of the puzzles 6.

With this, since the user needs to erase the puzzles 6 corresponding to the character 7a desired to generate, it is possible to provide a more highly interesting strategic game with characters linked with puzzles.

On a game screen D3 of the mobile terminal 100, if the user erases the puzzles 6, the cumulative points of the character 7a corresponding to an icon shown in the erased puzzles 6 are accumulated in the gauge G. If the gauge G is full (the cumulative points exceed a predetermined threshold value), the corresponding character 7a is generated near the gauge G (for example, the ending point, the center, or the like on the gauge G).

As illustrated in FIG. 6, when there are four characters 7a1 to 7a4 in the lower portion of the game screen D3 (before the play starts, the user selects four characters 7a among the usable characters 7a), for example, if the gauge G2 of the character 7a2 is full, the character 7a2 is generated and appears on the gauge G2. The generated character 7a2 starts to move upward on the game screen D3 from the generation position while moving to the right and the left.

In this way, each character 7a may be generated on each gauge G in the lower portion of the game screen D3 and may move upward on the game screen D3 from the generation position. With this, the user is required for a strategy different from when the character 7a currently selected is displayed near a position corresponding to the end of the locus followed by the user, and it is possible to newly provide a highly interesting game.

As described above, a cumulative value of points required to generate each character 7a may be different for each character 7a. The mobile terminal 100 can limit the total number of characters 7a to be generated. For example, when a given number of characters 7a3 are already generated on the game screen D3, it is possible to correct point addition to the gauge G3 such that the character 7a3 is hardly generated even if the user erases the puzzles 6 corresponding to the character 7a3.

The characters 7a which are generated according to the puzzles 6 erased by the user may be not only a character which has an icon shown in the puzzles 6 as an item, but also a character (hereinafter, referred to as "friend character 7a4") which is operated by another user other than the user. The friend character 7a4 can be a character which indicates another user who performs the game in another mobile terminal. In this case, the user can select the friendly character 7a4 among the usable characters 7a before the play of each stage starts. With this, it is possible to make a character indicating another user appear in the game of the user and to allow the user to feel a sense of presence while progressing in the game with another user.

The puzzles 6 to be erased by the user may include a puzzle which can recover a health point value HP of the character 7a, which is performing a battle with the enemy character 7b. With this, since the puzzles 6 are required to be erased while determining whether or not to maintain the character 7a which is performing a battle or to generate a new character 7a along with the progress of the game, it is possible to provide a more highly interesting strategic game.

Linked Erasure of Puzzles

Figure 7:
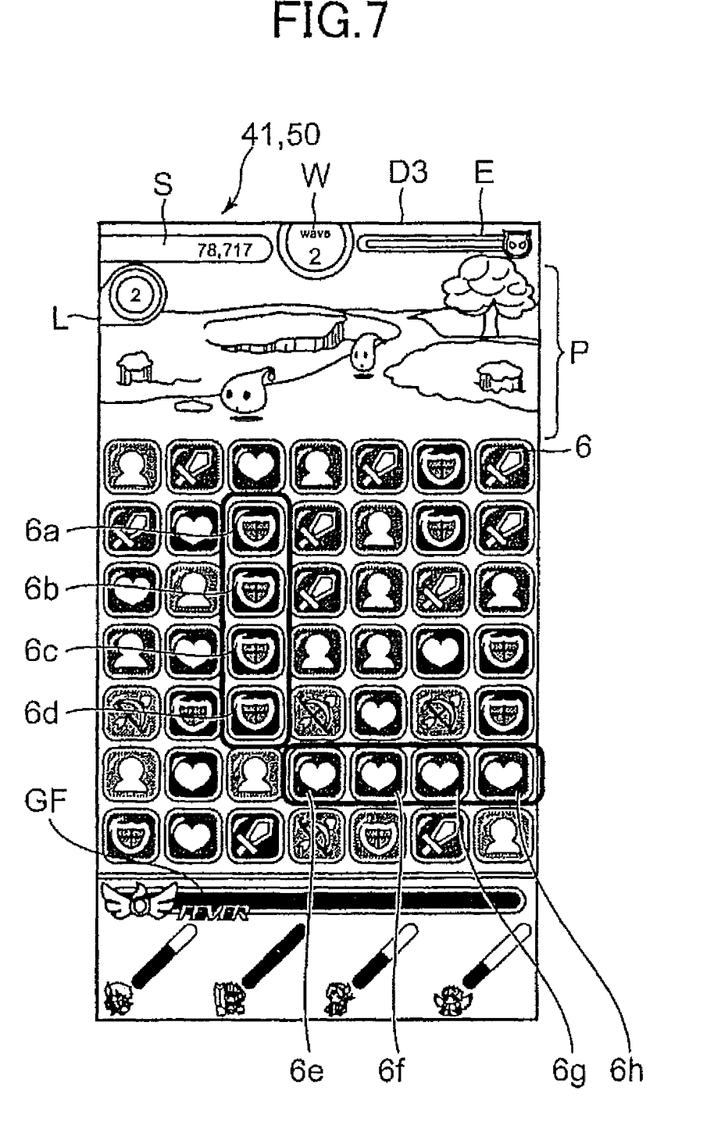
FIG. 7 is a schematic view illustrating an example of a game screen displayed when puzzles are accumulated and a predetermined number or more of puzzles are erased.

The user erases the puzzles 6, and when the puzzles 6 are accumulated and a predetermined number or more of puzzles 6 are erased, the mobile terminal 100 can automatically activate a predetermined effect. Specifically, as illustrated in FIG. 7, if the user erases the puzzles 6, points are added to a fever gauge GF, and the fever gauge GF increases. If the fever gauge GF is full (the cumulative points exceed a predetermined threshold value), a predetermined effect is automatically activated.

As the predetermined effect, if the puzzles 6 satisfy a predetermined condition and are adjacent to one another, all of the adjacent puzzles 6 are automatically erased. In the example illustrated in FIG. 7, the predetermined condition is that a given number or more of puzzles 6 of the same icon are continuously adjacent to one another. In FIG. 7, four puzzles 6a to 6d are continuously vertical, four puzzles 6e to 6h are continuously horizontal, and these puzzles 6a to 6h are erased. If the puzzles 6a to 6h are erased, the arrangement of other puzzles 6 is changed by the puzzle change unit 15 (for example, other puzzles 6 displayed in the upper portion of the screen from the puzzles 6a to 6h are sequentially moved down and arranged such that the positions at which the puzzles 6a to 6h are displayed are filled with other puzzles 6). If a predetermined number or more puzzles 6 after the arrangement is changed are further continuously adjacent to one another, all of the adjacent puzzles 6 are automatically erased, and the puzzle change unit 15 further changes the arrangement of other puzzles 6. In this case, puzzles satisfying a condition are sequentially erased to link with the initial erasure. With this, it is possible to allow the user to acquire points at a time and give the user a sense of exhilaration such that the puzzles are erased at a time from the game screen.

If the link of the puzzle erasure occurs, various benefits are awarded to the user. The benefits are as follows: for example, (1) a parameter of a specific character 7a among the selected characters 7a changes to the user's advantage (for example, hit point, attack power, defense power, or movement speed increases, attack range or movement range is widened or the like), (2) the hit point for a specific enemy character 7b increases (for example, the hit point becomes 20 times), (3) the specified enemy character 7b is easily shot, (4) a given damage can be given to all enemy characters 7b appearing on the game screen, (5) the attack power of the enemy character 7b is weakened for a given period of time (the enemy falls insensible, the enemy is poisoned or the like), and the user easily attacks the enemy character 7b and the like. In this way, if the predetermined effect is activated, since various benefits are awarded to the user, the user is required for a strategy to successively erase the puzzles 6 as long as possible to acquire points such that the fever gauge GF is full or the like. Therefore, it is possible to provide a highly interesting strategic game.

If the predetermined effect is activated, the mobile terminal 100 may change the color of the puzzles 6 satisfying a predetermined condition and are adjacent to one another, or may display the puzzles 6 with blinking or the like. While the predetermined effect is activated, the game screen D4 may be changed in color as a whole (the color of the background may be changed or the like), or may be displayed with blinking.

If the fever gauge GF is full, before a predetermined effect is activated, the puzzle change unit 15 may change the arrangement of the puzzles 6 such that the chain of the erasure of the puzzles 6 occurs. In FIG. 7, although when a given number or more of puzzles 6 of the same icon are adjacent to one another has been illustrated, for example, and when a given number or more of puzzles 6 of the same color are adjacent to one another, the puzzles may be erased.

Benefit according to method of erasing puzzles

The mobile terminal 100 can award a benefit having a predetermined effect in the game to the user according to a touch operation to draw a locus 1 on the input surface 41. For example, when a locus 1 which connects a puzzle 6 in a lower portion of a game screen and a puzzle 6 in an upper portion of the game screen in a straight line is drawn, the mobile terminal 100 may increase the movement speed of a character 7a displayed on the puzzle 6.

Alternatively, when a locus 1 which connects a puzzle 6 on a left side of a game screen and a puzzle 6 on a right side of the game screen in a straight line is drawn, the mobile terminal 100 may increase the attack power of a character 7a displayed on the puzzle 6.

The mobile terminal 100 may change the parameters of the character 7a according to the color or pattern (attribute) of a plurality of erased puzzles 6. For example, when the erased puzzle 6 is red, the mobile terminal 100 may increase the attack power of the character 7a displayed on the puzzle 6.

Other Configurations

When the game ending condition (for example, the enemy character 7b reaches the lowest portion of the game screen) is about to be satisfied, the mobile terminal 100 can apply a predetermined effect to the game screen. For example, the mobile terminal 100 can display the game screen with blinking With this, the mobile terminal 100 can make the user strongly recognize that the game is about to be over and can trigger a sense of crisis.

The mobile terminal 100 can arrange predetermined obstacles instead of the puzzles 6 or on the puzzles 6 in a superimposed manner. For example, the mobile terminal 100 can arrange a fence, a swamp, a pond, a mine, ice, and the like which obstruct the movement of the enemy character 7b.

In this case, for example, an enemy character 7b having a flying ability can freely move on the puzzles 6 regardless of whether or not the obstacles are arranged. An enemy character 7b stepping into a swamp may be swallowed into the swamp and may disappear. An enemy character 7b practicing magic can freezes a swamp or a pond through which an enemy character 7b having no flying ability is impassable, whereby the enemy character 7b is passable through the swamp or the pond. When the character 7a or the enemy character 7b moves on the frozen swamp or pond, the path may change randomly. The user may perform a touch operation, thereby change the arrangement of the obstacles.

The obstacles may constitute the puzzles 6. For example, when the user follows the input surface 41 to draw a locus 1 to connect a plurality of swamps, the swamps can be erased. Alternatively, when a locus 1 is drawn to connect a plurality of fences, the fences can be changed to a powerful fence. A plurality of obstacles may be present at the same coordinate. For example, the mobile terminal 100 may arrange a structure such as a bridge, over a swamp or may arrange a swamp under ice.

In this case, the puzzles and/or the characters are constituted by various variations, the mobile terminal 100 can provide a more highly interesting strategic game with puzzles linked with battle between characters.

The mobile terminal 100 can provide an experience value to the character 7a according to the progress of the game. When a cumulative value of the experience value exceeds a predetermined threshold value, the level of the character 7a increases (the character 7a grows). When the level of the character 7a is higher, the mobile terminal 100 can change the parameters (hit point, attack power, defense power, attack range, movement speed, movement range, and the like) of the character 7a.

With this, the mobile terminal 100 can give the user the pleasure of bringing up the character 7a. Therefore, the mobile terminal 100 can give the user a sense of immersion in the game.

Processing Executed By Mobile Terminal 100

Figure 4:
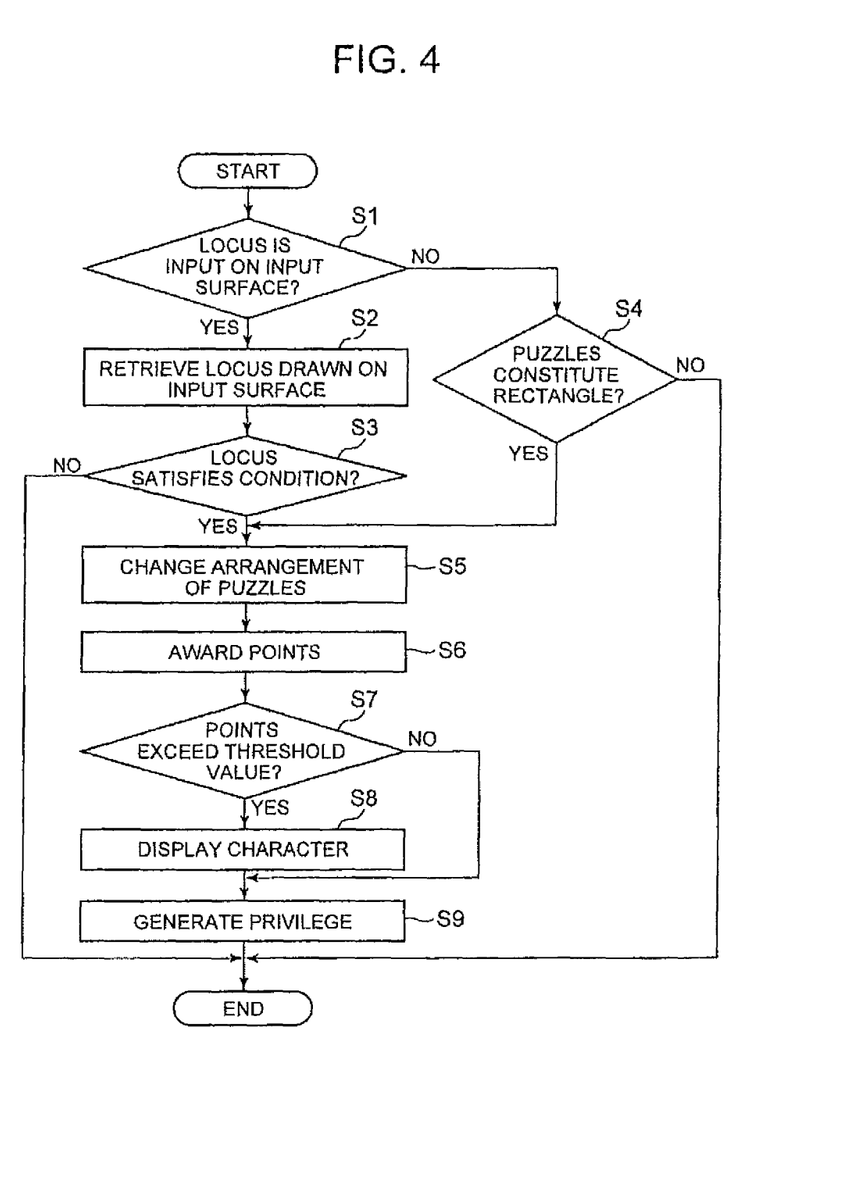
FIG. 4 is a flowchart illustrating an example of processing executed by the mobile terminal.

FIG. 4 is a flowchart illustrating an example of processing executed by the mobile terminal 100.

The input control unit 42 determines whether or not a locus 1 is input on the input surface 41 (Step 1; hereinafter, "Step" is abbreviated as "S"). When it is determined that the locus 1 is input (YES in S1), the input control unit 42 retrieves the locus 1 (S2). Next, the puzzle determination unit 11 determines whether or not a plurality of puzzles 6 selected by the locus 1 satisfies the predetermined conditions (S3, determination step), and when it is determined that the puzzles 6 satisfy the predetermined conditions (YES in S3), the puzzle change unit 15 erases (deletes) a plurality of puzzles 6 included in the locus 1 and changes the arrangement of other puzzles 6 (S5).

The rectangle determination unit 12 determines whether or not a predetermined number or more of puzzles 6 are arranged to form a rectangle (S4). When it is determined that the puzzles 6 are arranged to form a rectangle (YES in S4), the puzzle change unit 15 erases the puzzles 6 included in the rectangle and changes the arrangement of other puzzles 6 different from the puzzles 6 (S5).

The point awarding unit 14 awards points according to the number of puzzles 6 erased by the puzzle change unit 15, or the like (S6), and the point determination unit 16 determines whether or not the cumulative value of the points exceeds a predetermined threshold value (S7). When the cumulative value of the points exceeds the predetermined threshold value (YES in S7), the display output unit 17 displays the character 7a currently selected by the user on the puzzle 6 (S8, display step). The benefit generation unit 13 can generate a benefit having a predetermined effect in the game according to the locus 1 (S9).

Example of Realization by Software

A control block (in particular, the control unit 10) of the mobile terminal 100 may be realized by a logic circuit (hardware) formed by an integrated circuit (IC chip) or may be realized by software using a central processing unit (CPU). In the latter case, the mobile terminal 100 includes a CPU which executes a command of the game program as software to realize the respective functions, a read only memory (ROM) or a storage device (these are collectively referred to as "recording medium") which records the game program and various kinds of data in a computer (CPU)-readable state, a random access memory (RAM) on which the game program is expanded and the like. A computer (or the CPU) reads the game program from the recording medium and executes the game program. As the recording medium, "non-transitory medium," for example, a tape, a disk, a card, a semiconductor memory, a programmable logic circuit, or the like may be used. The game program may supply the game program to the computer through an arbitrary transmittable transmission medium (communication network, broadcast wave, or the like). The game program may be realized in the form of a data signal buried in a carrier in which the game program is implemented by electronic transmission.

Specifically, the game program can process the progress of a puzzle game and a battle game and causes a computer (mobile terminal 100) to realize a determination function, a display function, a change function, an awarding function, a point determination function, and a generation function.

The determination function determines whether or not a puzzle selected by a touch operation satisfies predetermined conditions. The determination function can be realized by the determination unit 18 (puzzle determination unit 11 and rectangle determination unit 12). The details are as described above.

When it is determined by the determination function that the predetermined conditions are satisfied, the display function displays game content for use in the battle game on a screen of the puzzle game. The display function can be realized by the display output unit 17. The details are as described above.

When it is determined by the determination function that the predetermined conditions are satisfied, the change function erases (deletes) the puzzle and changes the arrangement of other puzzles different from the puzzles. The change function can be realized by the puzzle change unit 15. The details are as described above.

The awarding function awards points according to awarding conditions including the number of puzzles satisfying the predetermined conditions as one of the conditions. The awarding function can be realized by the point awarding unit 14. The details are as described above.

The point determination function determines whether or not a cumulative value of points awarded by the awarding function exceeds a predetermined threshold value. The point determination function can be realized by the point determination unit 16. The details are as described above.

The generation function generates a benefit having a predetermined effect in the game according to a touch operation to draw a locus on the input surface. The generation function can be realized by the benefit generation unit 13. The details are as described above.

My programs, apparatus and methods are not limited to the above-described examples, and may be altered by those skilled in the art within the scope of the appended claims. An example based on a proper combination of technical means disclosed in different examples is encompassed in the technical scope of this disclosure. New technical features can be formed by combining technical means disclosed in the examples.

My programs, apparatus and methods can be widely applied to an arbitrary computer including an input surface capable of detecting a position designated by a user's operation such as a smartphone, a tablet terminal, a mobile phone, or a personal computer.

What is claimed:

1. A non-transitory computer-readable medium that stores a program thereon that, when executed on a computer including circuitry and a touch panel display capable of detecting a touch operation of a user, causes the circuitry to:
   display, on the touch panel display, a first region for displaying puzzle pieces and a second region that is different from the first region;
   display a plurality of puzzle pieces in the first region;
   detect a locus of the touch operation on the touch panel display;
   identify a first set of puzzle pieces of the plurality of the puzzle pieces selected by the locus of the touch operation;
   responsive to detecting an end of the touch operation, erase the first set of puzzle pieces; and
   display in the first region, one or more obstacles instead of one or more of the plurality of the puzzle pieces or on one or more of the plurality of the puzzle pieces in a superimposed manner, the one or more obstacles obstructing movement of at least one game content in the first region.

2. The non-transitory computer-readable medium according to claim 1, wherein the program, when executed on the computer, further causes the circuitry to
   erase at least one of the one or more obstacles which is selected by the locus of the touch operation.

3. The non-transitory computer-readable medium according to claim 1, wherein the program, when executed on the computer, further causes the circuitry to
   determine whether the first set of puzzle pieces satisfies a first condition;
   responsive to the first set of puzzle pieces satisfying the first condition, display the at least one game content on at least one puzzle piece of the first set of puzzle pieces; and
   responsive to detecting the end of the touch operation, erase the at least one game content.

4. The non-transitory computer-readable medium according to claim 3, wherein the program, when executed on the computer, further causes the circuitry to
   responsive to detecting the end of the touch operation, erase the at least one game content; and
   update a game result and display the updated game result in the second region.

5. The non-transitory computer-readable medium according to claim 1, wherein the program, when executed on the computer, further causes the circuitry to
   determine an end of a stage in the game depending on any of an elapsed time after the game starts, a number of erased puzzle pieces and a number of acquired benefits.

6. The non-transitory computer-readable medium according to claim 1, wherein the program, when executed on the computer, further causes the circuitry to
   move remaining puzzle pieces of the plurality of the puzzle pieces to fill positions at which the first set of puzzle pieces were erased.

7. A method of controlling an information processing apparatus including circuitry and a touch panel display configured to detect a touch operation of a user comprising, by the circuitry:
   displaying, on the touch panel display, a first region for displaying puzzle pieces and a second region that is different from the first region;
   displaying a plurality of puzzle pieces in the first region;
   detecting a locus of the touch operation on the touch panel display;
   identifying a first set of puzzle pieces of the plurality of the puzzle pieces selected by the locus of the touch operation;
   responsive to detecting an end of the touch operation, erasing the first set of puzzle pieces; and
   displaying, in the first region, one or more obstacles instead of one or more of the plurality of the puzzle pieces or on one or more of the plurality of the puzzle pieces in a superimposed manner, the one or more obstacles obstructing movement of at least one game content in the first region.

8. The method according to claim 7, further comprising
   by the circuitry, erasing at least one of the one or more obstacles which is selected by the locus of the touch operation.

9. The method according to claim 7, further comprising
   by the circuitry, determining whether the first set of puzzle pieces satisfies a first condition;
   responsive to the first set of puzzle pieces satisfying the first condition, by the circuitry, displaying the at least one game content on at least one puzzle piece of the first set of puzzle pieces; and
   responsive to detecting the end of the touch operation, by the circuitry, erasing the at least one game content.

10. The method according to claim 9, further comprising
    responsive to detecting the end of the touch operation, by the circuitry, erasing the at least one game content; and
    by the circuitry, updating a game result and display the updated game result in the second region.

11. The method according to claim 7, further comprising by the circuitry, determining an end of a stage in the game depending on any of an elapsed time after the game starts, a number of erased puzzle pieces and a number of acquired benefits.

12. The method according to claim 7, further comprising by the circuitry, moving remaining puzzle pieces of the plurality of the puzzle pieces to fill positions at which the first set of puzzle pieces were erased.

13. An information processing apparatus which includes circuitry and a touch panel display capable of detecting a touch operation of a user, the circuitry being configured to:
   display, on the touch panel display, a first region for displaying puzzle pieces and a second region that is different from the first region;
   display a plurality of puzzle pieces in the first region;
   detect a locus of the touch operation on the touch panel display;
   identify a first set of puzzle pieces of the plurality of the puzzle pieces selected by the locus of the touch operation;
   responsive to detecting an end of the touch operation, erase the first set of puzzle pieces; and
   display, in the first region, one or more obstacles instead of one or more of the plurality of the puzzle pieces or on one or more of the plurality of the puzzle pieces in a superimposed manner, the one or more obstacles obstructing movement of at least one game content in the first region.

14. The information processing apparatus according to claim 13, wherein the circuitry is further configured to erase at least one of the one or more obstacles which is selected by the locus of the touch operation.

15. The information processing apparatus according to claim 13, wherein the circuitry is further configured to
   determine whether the first set of puzzle pieces satisfies a first condition;
   responsive to the first set of puzzle pieces satisfying the first condition, display the at least one game content on at least one puzzle piece of the first set of puzzle pieces; and
   responsive to detecting the end of the touch operation, erase the at least one game content.

16. The information processing apparatus according to claim 15, wherein the circuitry is further configured to
   responsive to detecting the end of the touch operation, erase the at least one game content; and
   update a game result and display the updated game result in the second region.

17. The information processing apparatus according to claim 13, wherein the circuitry is further configured to
   determine an end of a stage in the game depending on any of an elapsed time after the game starts, a number of erased puzzle pieces and a number of acquired benefits.

18. The information processing apparatus according to claim 13, wherein the circuitry is further configured to
   move remaining puzzle pieces of the plurality of the puzzle pieces to fill positions at which the first set of puzzle pieces were erased.

* * * * *